United States Patent Office 3,510,380
Patented May 5, 1970

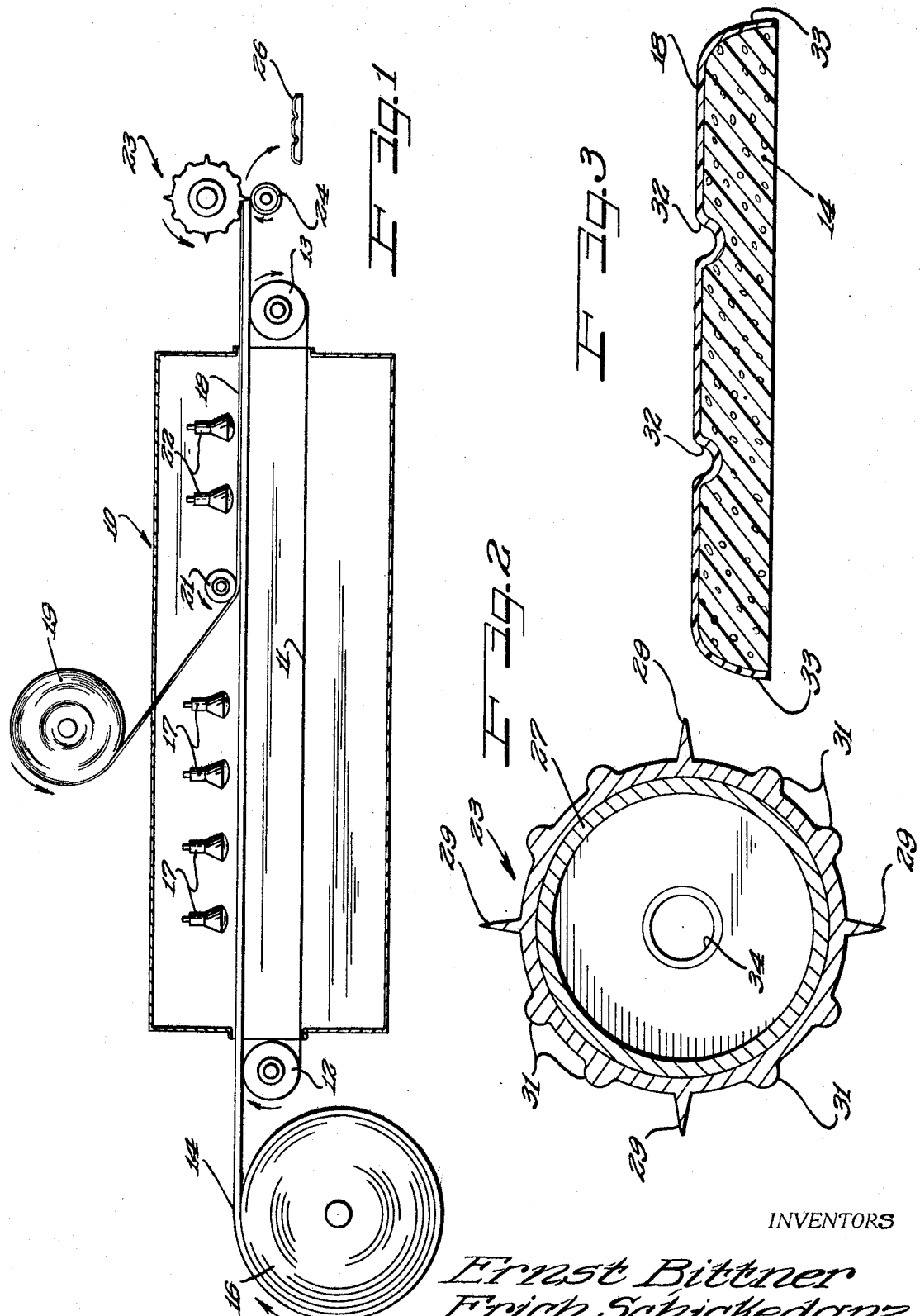

3,510,380
LAMINATED FOAM ARTICLES AND METHOD OF MAKING THE SAME
Ernst Bittner, Frankfurt am Main, and Erich Schickedanz, Illereichen-Altenstadt, Germany, assignors to The Scholl Mfg. Co., Inc., Chicago, Ill., a corporation of New York
Filed Feb. 16, 1967, Ser. No. 616,679
Int. Cl. B32b 31/18
U.S. Cl. 156—251                                6 Claims

ABSTRACT OF THE DISCLOSURE

Method and apparatus for heat sealing one or more thermoplastic cover sheets to a base of a synthetic resin foam wherein a continuous web of the foam is advanced through a heating zone where it is combined with one or more cover sheets of thermoplastic material, and the resulting laminate is then heated to a temperature sufficient to soften the thermoplastic sheet material, whereupon the resulting laminate is severed by means of sold cutting dies which heat seal the edges of the sheet to the foam at the time of severing.

BACKGROUND OF THE INVENTION

This invention is in the field of laminating thermoplastic cover sheets to synthetic resin foams in a continuous process. Such laminated products are useful in shoe insoles, automobile mats, bath mats, and cases for glasses.

DESCRIPTION OF THE PRIOR ART

The lamination of one or more thermoplastic cover sheets to synthetic resin foams such as polyurethane foams has been accomplished previously by means of high frequency energy. The sealing of such sheets to foam, however, requires high energy levels and a relatively long time, particularly where the foam has a substantial thickness. The lamination and heat sealing of a thermoplastic cover sheet to a foam frequently takes as much as three to five times as much time to accomplish the union as required for the heat sealing of unfoamed plastic material.

SUMMARY OF THE INVENTION

In the method and apparatus of the present invention, a cover sheet of thermoplastic material is continuously sealed to a web of synthetic resin foam by advancing a continuous web of the foam to a heating zone, heating the web in the zone to an elevated temperature, applying a continuous web of a thermoplastic sheet material to the moving web while it is in the heating zone, then jointly heating the foam web and the overlying thermoplastic sheet in the zone, and thereafter severing the sheet and foam with a cutter having a temperature substantially lower than the temperature of said sheet and foam to thereby seal edges of the sheet to the foam during severing. It is also possible to emboss the cover layer at the time the severing is accomplished to provide a desired profile in the finished article.

BRIEF DESCRIPTION OF THE DRAWINGS

FIG. 1 is a somewhat schematic view of a laminating and severing assembly which can be used in accordance with the present invention;

FIG. 2 is a cross-sectional view of a type of rotary die cutter which can be used; and FIG. 3 is an enlarged cross-sectional view of an embossed and sealed product produced according to the present invention.

DESCRIPTION OF THE PREFERRED EMBODIMENTS

In accordance with the present invention, both the thermoplastic cover sheet and the synthetic resin foam base are preheated to a temperature which at least softens the thermoplastic cover sheet, but is short of the point where the thermoplastic material would begin to flow. The temperature should, of course, be below that which would cause damage to the foam. For a polyurethane foam and a polyvinyl chloride cover sheet, temperatures of around 100 to 160° C. are appropriate. Because the foam is substantially thicker, for most applications, than the cover sheet it is usually desirable to heat the foam for longer periods of time than the cover sheet in order to achieve the proper temperatures.

After heating, the foam and the cover sheet are then passed to a cutter such as a rotary die cutter operating at substantially lower temperatures, say at room temperature, where the composite is severed while at the same time joining the cover sheet to the underlying foam along the lines of severance. The severing with a cold die requires only a very small interval of time and nevertheless achieves a clean, uniformly welded joint between the two layers.

Referring now to the drawings, in FIG. 1, reference numeral 10 indicates generally a heating zone to which a conveyor belt 11 is arranged to pass, the conveyor belt 11 extending between a pair of opposed rollers 12 and 13. A web 14 of a synthetic foam material, such as polyurethane or the like is continuously unwound from a roll 16 and deposited on the upper run of the conveyor belt 11.

In passing through the heating zone 10, the continuous web 14 of the foam is subjected to heating as by means of a plurality of spaced infrared lamps 17. Then, a thin strip 18 of a thermoplastic cover sheet material is applied over the traveling web 14, the strip 18 being unwound from a supply roll 19 and being received beneath a guide roller 21. The foam web 14 and the strip 18 are then heated jointly by additional infrared lamps 22 until such time as the composite web leaves the heating zone 10.

The webs are severed by means of a cold cutting device such as a rotary die cutter 23 acting against the backing roll 24. The resulting article 26 is then cooled and ready for storage.

A typical type of rotary die cutter which can be used in accordance with the present invention is best illustrated in the cross-sectional view of FIG. 2. The die cutter 23 may include a stationary hollow core 27 about which a cutter 28 is mounted for rotation. The face of the cutter 28 includes knife edges 29 for severing the foam and the overlying cover layer, as well as ribs 31 intermediate the knife edges for the purpose of embossing the composite in preselected areas along the face. This is illustrated best in FIG. 3 where a series of depressions 32 are shown in the face of the finished article. In the areas of the depressions 32, the pressure provided by the ribs 31 is sufficient to create weld lines between the cover sheet and the underlying foam 14 in view of the heated condition of both the foam 14 and the cover sheet 18. As also illustrated in FIG. 3, the action of the knife edges 29 tends to stretch the cover sheet 18 in its heated condition thereby providing the laminate with generally rounded marginal edges 33 at the point of severing.

In order to maintain the temperature of the rotary die cutter 23 substantially below the temperature of the material being cut, it is advisable to circulate a coolant such as water through the hollow core 27, the coolant being introduced through a suitable conduit 34 in the end of the core 27 as illustrated in FIG. 2.

The process and apparatus of the present invention can be used with any type of foam and thermoplastic cover material. For example, the foam itself can be thermoplastic such as polyvinyl chloride foam. The cover sheet can also be any of a variety of thermoplastic materials such as polymerized vinyl compounds or acrylates or other heat sealable synthetic resins.

The process of the present invention has made it possible to substantially reduce the amount of time required for sealing a cover sheet to the synthetic resin foam while achieving a good adhesion between the layers to be joined. By adjustment of the temperature it is possible to regulate the strength of the bond between the layers to be joined together which is desirable in some applications.

It should be evident that various modifications can be made to the described embodiments without departing from the scope of the present invention.

We claim as our invention:

1. The method of continuously heat sealing a thermoplastic sheet to a synthetic resin foam which comprises advancing a continuous web of said foam to a heating zone, heating said web in said zone to an elevated temperature, applying a continuous web of a thermoplastic sheet to the moving web while in said heating zone, jointly heating the foam web and the overlying thermoplastic sheet in said zone, and thereafter severing the sheet and foam with a cutter having a temperature substantially lower than the temperature of said sheet and foam to thereby seal edges of said sheet to said foam.

2. The method of claim 1 in which said sheet and foam are simultaneously embossed as they are being severed.

3. The method of claim 1 in which said foam is a polyurethane foam and said thermoplastic sheet includes polyvinyl chloride.

4. An apparatus for continuously heat sealing which comprises a heating zone, means for conveying a continuous web of synthetic resin foam through said heating zone, means for applying a continuous web of a thermoplastic sheet onto the foam web in said heating zone, means for heating the two webs while they are in contact in said heating zone, cutting means for severing the two webs after the webs have been heated to a temperature sufficient to soften the thermoplastic sheet, and means for cooling said cutting means to a temperature substantially below the temperature of said thermoplastic sheet.

5. The apparatus of claim 4 in which said cutting means also includes an embossing means for embossing the combined webs at the time of severing.

6. The apparatus of claim 4 in which said cutting means is a rotary die cutter.

References Cited

UNITED STATES PATENTS

| 2,113,128 | 4/1938 | Cunnington | 156—219 X |
|-----------|--------|------------|-----------|
| 2,582,294 | 1/1952 | Stober | 161—123 X |
| 3,332,204 | 7/1967 | Frank | 156—311 X |

VERLIN R. PENDEGRASS, Primary Examiner

U.S. Cl. X.R.

156—209, 311, 515

UNITED STATES PATENT OFFICE
CERTIFICATE OF CORRECTION

Patent No. 3,510,380      Dated May 5, 1970

Inventor(s) ERNST BITTNER and ERICH SCHUCKEDANZ

It is certified that error appears in the above-identified patent and that said Letters Patent are hereby corrected as shown below:

Column 1, line 21, "sold cutting dies" should be --cold cutting dies--.

SIGNED AND SEALED
SEP 22 1970

(SEAL)
Attest:

Edward M. Fletcher, Jr.
Attesting Officer

WILLIAM E. SCHUYLER, JR.
Commissioner of Patents